(12) United States Patent
Zhao et al.

(10) Patent No.: US 8,597,378 B2
(45) Date of Patent: Dec. 3, 2013

(54) REVERSIBLE BATTERY ASSEMBLY AND TOOLING FOR AUTOMATED HIGH VOLUME PRODUCTION

(71) Applicant: GM Global Technology Operations LLC, Detroit, MI (US)

(72) Inventors: Xiang Zhao, Novi, MI (US); Yhu-Tin Lin, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/719,308

(22) Filed: Dec. 19, 2012

(65) Prior Publication Data

US 2013/0104390 A1  May 2, 2013

Related U.S. Application Data

(62) Division of application No. 12/727,503, filed on Mar. 19, 2010, now Pat. No. 8,361,647.

(51) Int. Cl.
*H01M 2/26* (2006.01)
*H01M 2/00* (2006.01)

(52) U.S. Cl.
USPC .................................. 29/623.1; 429/730

(58) Field of Classification Search
USPC ........................................ 29/623.1, 730
See application file for complete search history.

(56) References Cited

U.S. PATENT DOCUMENTS

2004/0021442 A1* 2/2004 Higashino ................... 320/112

* cited by examiner

*Primary Examiner* — Karie O'Neill Apicella
(74) *Attorney, Agent, or Firm* — Fraser Clemens Martin & Miller LLC; J. Douglas Miller

(57) ABSTRACT

A battery module includes a plurality of battery cells arranged in a stack, each of the battery cells including a pair of spaced apart tabs extending therefrom, a rigid support plate coupled to at least one of the tabs, and a busbar coupled to at least one of the tabs of each of a pair of adjacent battery cells.

7 Claims, 7 Drawing Sheets

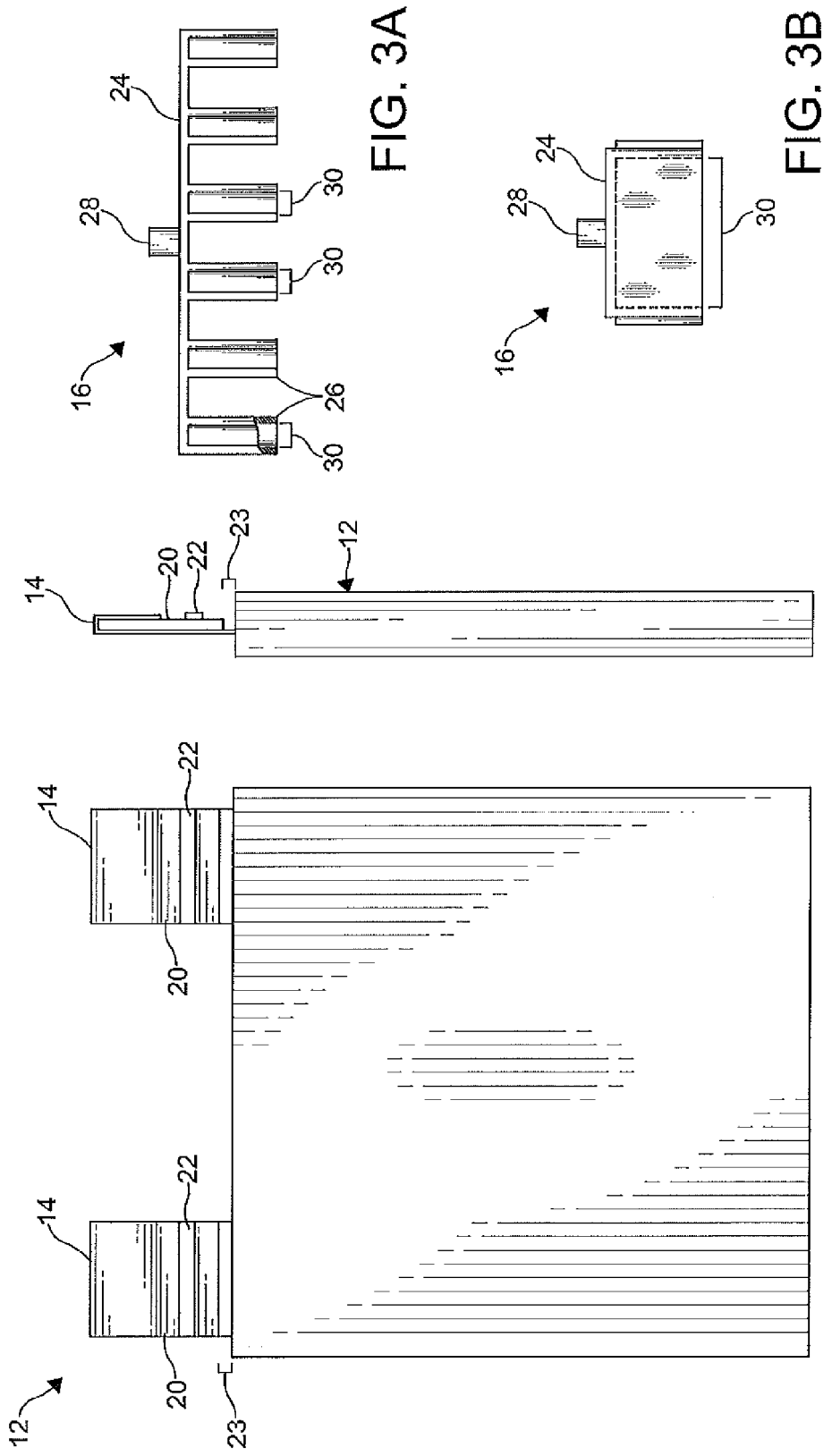

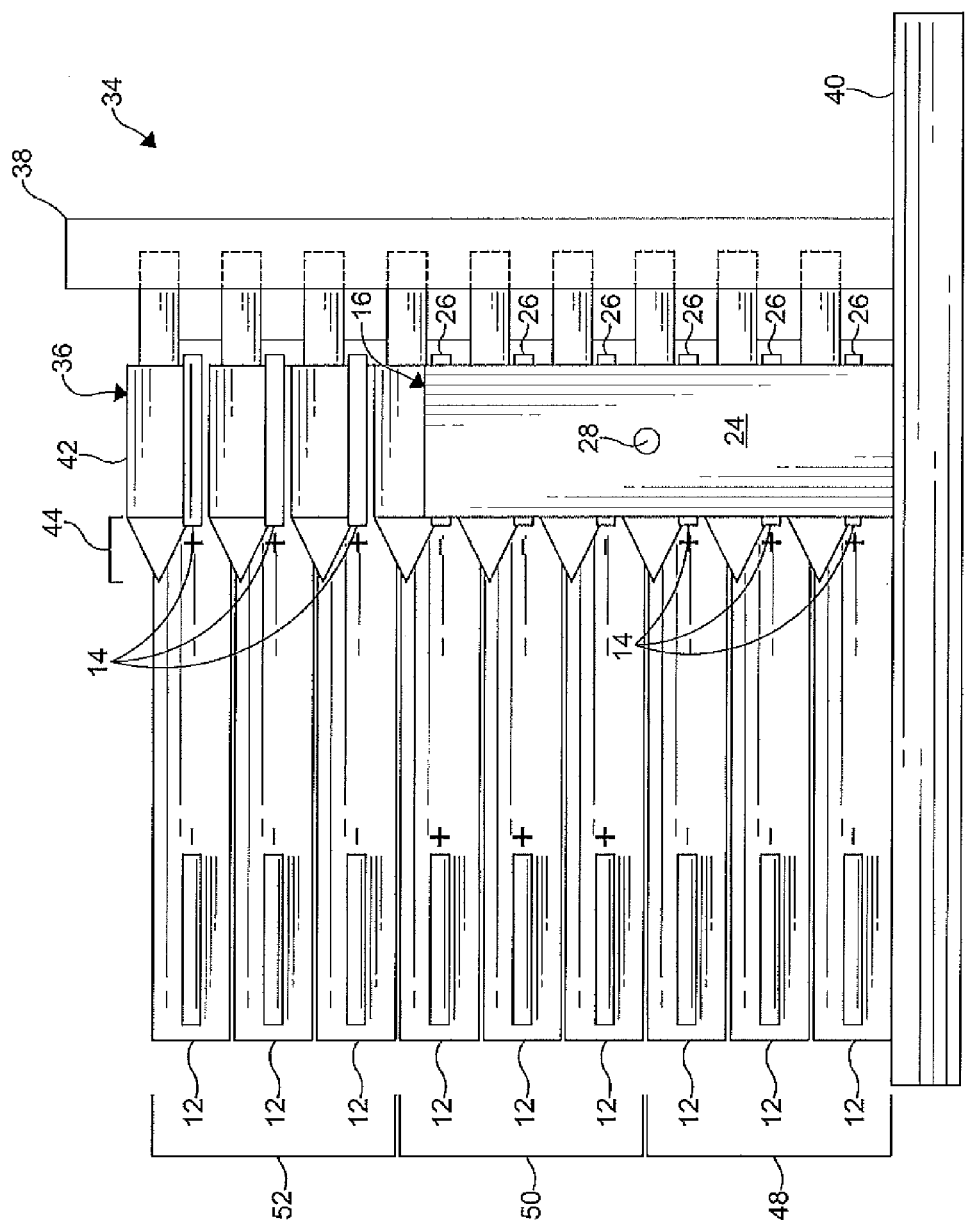

REVERSIBLE BATTERY ASSEMBLY AND TOOLING FOR AUTOMATED HIGH VOLUME PRODUCTION

CROSS-REFERENCE TO RELATED APPLICATIONS

This application is a divisional application of U.S. patent application Ser. No. 12/727,503, filed on Mar. 19, 2010. The entire disclosure of the above application is incorporated herein by reference.

FIELD OF THE INVENTION

The present invention generally relates to a battery module having a plurality of battery cells. In particular, the invention is directed to a battery module and a method for assembling the battery module.

BACKGROUND OF THE INVENTION

A battery assembly for hybrid, plug-in electric (EV), or other type vehicles includes a plurality of battery cells. Cooling fins, repeating frames and foams, and electrical interconnects are joined to the battery cells to form a battery module or battery pack. The battery module for a long driving range EV may contain more than two hundred battery cells.

Currently, after stacking and assembling the battery cells and other components into the battery module, every two or three adjacent battery cells are welded together with U-channel sheet metals to form serial/parallel electric connections. Specifically, each of the battery cells has at least two tabs or electric terminals (one positive, one negative) that are welded to the U-channel sheet metals. In certain applications, the tabs of each of the battery cells are bent such that the tips of the tabs are aligned after welding. Unfortunately, due to the difficulty of precise tab bending and position control during welding, uneven tab height still exists. Uneven and misaligned tabs affect the overall weld quality between the tabs and the U-channel sheets and pose a risk of short circuiting due to tab interference.

Furthermore, because of the irreversible nature of current welding techniques, such as spot welding and ultrasonic welding, removing a defective or "bad" battery cell from a fully assembled battery module requires cutting all of the tab connections in the battery module, thereby rendering the "good" battery cells unusable for re-weld or restoration to another battery module.

It would be desirable to develop a battery module and a method of assembling the battery module, wherein the battery module is repairable and remanufacturable at a minimal effort and cost, while maintaining a flexibility in serial/parallel connection of a plurality of battery cells as well as minimizing an occurrence of uneven tab alignment.

SUMMARY OF THE INVENTION

Concordant and consistent with the present invention, a battery module and a method of assembling the battery module, wherein the battery module is repairable and remanufacturable at a minimal effort and cost, while maintaining a flexibility in serial/parallel connection of a plurality of battery cells as well as minimizing an occurrence of uneven tab alignment, has surprisingly been discovered.

In one embodiment, a battery module comprises: a plurality of battery cells arranged in a stack, each of the battery cells including a pair of spaced apart tabs extending therefrom; a rigid support plate coupled to at least one of the tabs; and a busbar coupled to at least one of the tabs of each of a pair of adjacent battery cells.

In another embodiment, an apparatus for assembling a battery module having a plurality of battery cells comprises: a base; a grill carrier moveable relative to the base; and a grill rod coupled to the grill carrier, the grill rod having a main body with a longitudinal axis generally parallel to the base.

The invention also provides methods of assembling a battery module.

One method comprises the steps of: providing an apparatus having a base, a grill carrier moveable relative to the base, and a grill rod coupled to the grill carrier; disposing a plurality of battery cells on the base in a stacked relationship, each of the battery cells having a pair of tabs extending therefrom; moving the grill carrier toward the battery cells to dispose the grill rod between at least one tab of each of an adjacent pair of the battery cells; and coupling a busbar to the at least one tab of each of an adjacent pair of the battery cells.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which:

FIG. 2A is a front elevational view of a battery cell assembly according to an embodiment of the present invention;

FIG. 2B is a side elevational view of the battery cell assembly of FIG. 2A;

FIG. 3A is a side elevational view of a busbar according to an embodiment of the present invention, showing a cut-away portion of the busbar;

FIG. 3B is a front elevational view of the busbar of FIG. 3A;

FIG. 7A is a front elevational view of the grill fixture of FIG. 4 during an assembly process;

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
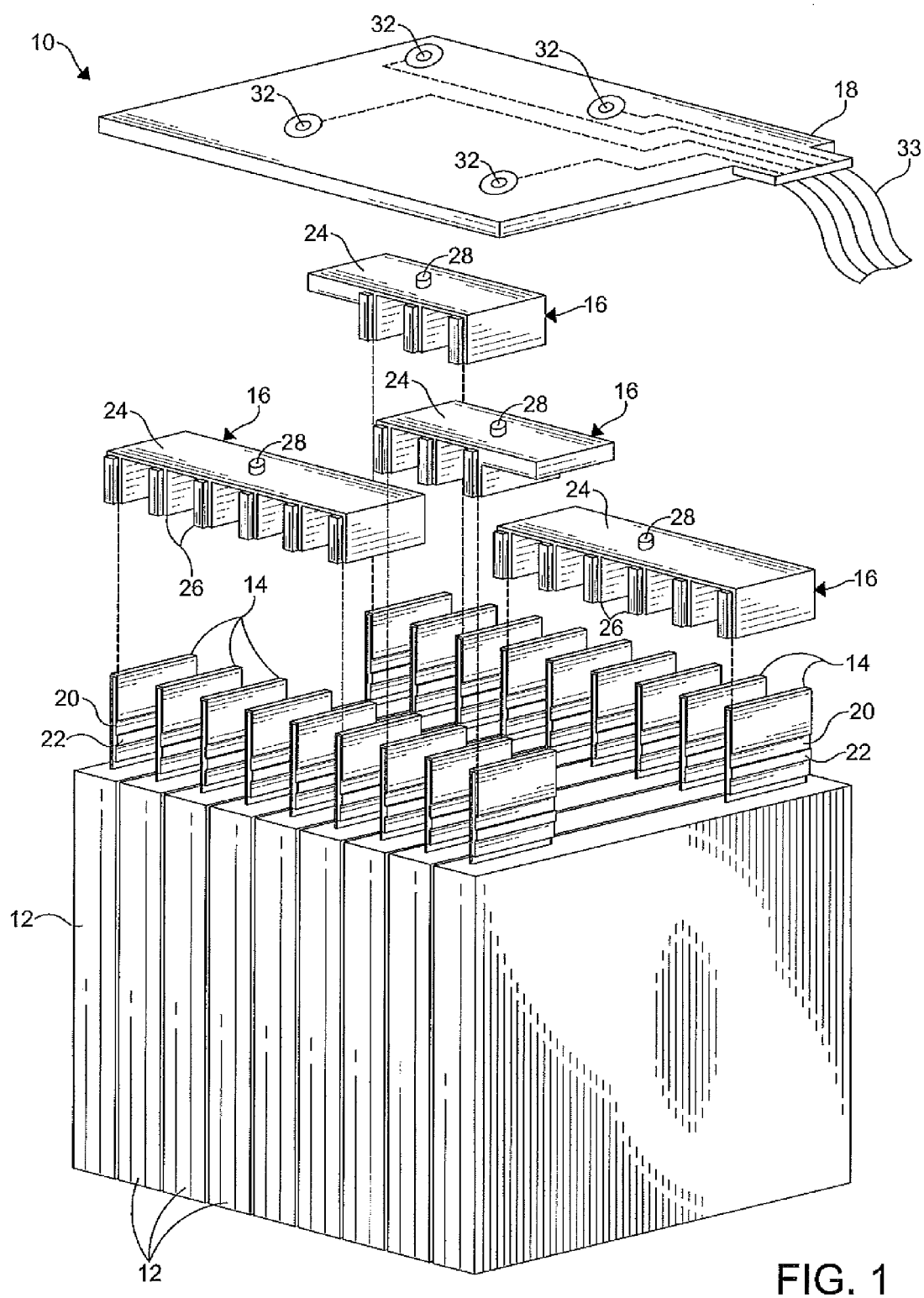
FIG. 1 is an exploded perspective view of a battery module according to an embodiment of the present invention.

FIGS. 1-3 illustrate a battery module 10 according to an embodiment of the present invention. As shown, the battery module 10 includes a plurality of battery cells 12, each of the battery cells 12 having a pair of tabs 14 (i.e. terminals), and a plurality of busbars 16 adapted to be coupled to the tabs 14. The battery module 10 further includes a control plate 18 disposed adjacent the busbars 16 and in electrical communication therewith. It is understood that each of the battery cells 12 can be a battery cell assembly including a plurality of stacked battery cells.

A support plate 20 is coupled to each of the tabs 14. As a non-limiting example, the support plate 20 is formed from a rigid non-conductive material similar to a material used in conventional printed circuit boards. However, other materials can be used. The support plate 20 includes a protuberance, referred to as a key 22, which is relied upon during the assembly operation, described herein below.

In certain embodiments, each of the tabs 14 is bent around a portion of the support plate 20 to increase a contact area between the tab 14 and the busbar 16. In other embodiments, the support plate 20 is adhered to a surface of the tab 14 without a bending or forming process. It is understood that any means of coupling the support plates 20 to the tabs 14 can be used. It is further understood that the support plates 20 provide a stiffness to the tabs 14, while allowing the tab 14 to maintain a flexible root portion 23 connecting with an electrode (not shown) of an associated one of the battery cells 12.

The busbars 16 are typically formed from a high electrical conductivity material such as copper, aluminum or gold. As a non-limiting example, an exterior surface of the busbar 16 is covered with insulating materials (not shown) such as those for electrical cables or plugs to avoid unwanted electrical contact. As shown, the busbars 16 each include a main body 24, a plurality of sockets 26 formed in the main body 24 (or separately formed and coupled thereto), and a terminal 28 formed in the main body 24 on a surface of the main body 24 opposite the sockets 26. As a non-limiting example, the terminal 28 is one of a conductive detail, a pin, a post, and an internal clip disposed on a surface of the busbar 16 opposite to the sockets 26.

Each of the sockets 26 includes an aperture 30 formed therein to receive one of the tabs 14. Each of the busbars 16 can include any number of sockets 26. It is understood that the aperture 30 of each of the sockets 26 is sized to receive the tab 14 having a support plate 20 coupled thereto. As a non-limiting example, the tab 14 is inserted into the aperture 30 with a force similar to the force typically required for electronic board installation in electric or electronic devices. In certain embodiments, the tab 14 coupled to the support plate 20 is press-fitted into the aperture 30 and no adhesive or welding process is required. It is understood that the forced insertion of the tab 14 into the aperture 30 secures the connection between the battery cells 12 and the busbar 16 and, through the "wedging effect", results in a contact force between the tab 14 and the busbar 16 that maximizes an actual, microscopic contact area, which in turn improves electrical conductance of the contact surfaces. It is further understood, the forced insertion causes surface rubbing of the contact interface, which can rupture the oxidation films grown on most metal surfaces exposed to air and hence, reduce the electrical resistance from the tab 14 to the busbar 16.

The control plate 18 includes a plurality of receptacles 32, each of the receptacles 32 is adapted to receive the terminal of one of the busbars 16 for monitoring and controlling a voltage and a current of the battery module 10. As shown, each of the receptacles 32 is in electrical communication with a connector 33 for transmitting and receiving feedback and control signals respectively.

Although the busbar-tab insertion process can be performed manually, the root portion 23 of each of the tabs 14 is typically too soft and flexible to support a force of the insertion resulting from an automated, high speed assembly operation.

Figure 4:
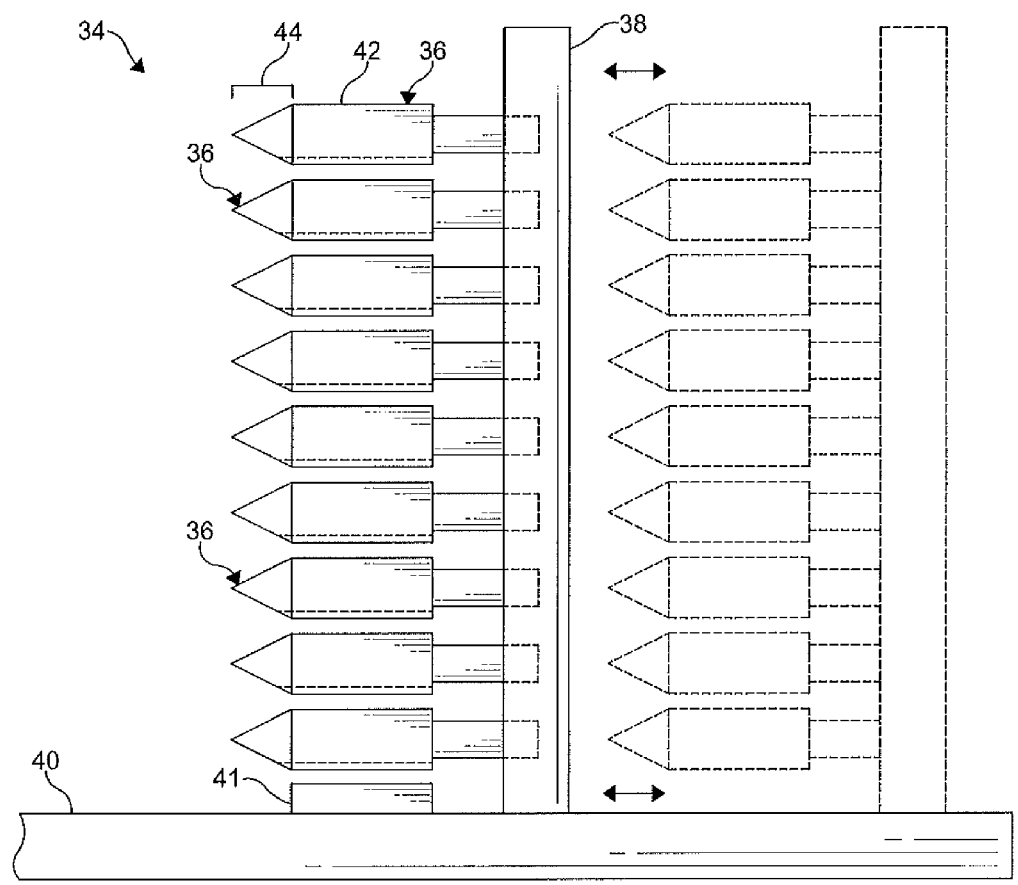
FIG. 4 is a front elevational view of a grill fixture according to an embodiment of the present invention.
Figure 5A:
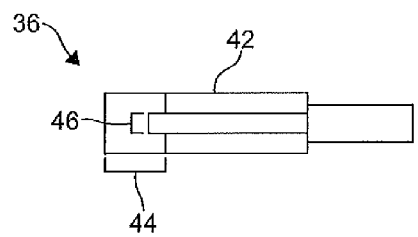
FIG. 5A is a bottom plan view of a grill rod of the grill fixture of FIG. 4.
Figure 5B:
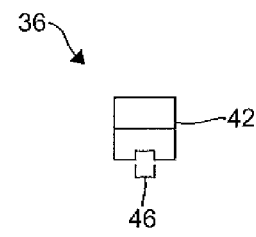
FIG. 5B is a side elevational view of a grill rod of the grill fixture of FIG. 4.

As shown in FIGS. 4-5, the invention conceives a grill fixture 34 to facilitate automated busbar-tab insertion. The grill fixture 34 includes a plurality of grill rods 36 which are equally spaced and rigidly mounted on the grill carrier 38. The grill carrier 38 is slideably coupled to a fixture base 40. It is understood that any means of slideably coupling the grill carrier 38 to the base 40 can be used such as a track system, for example. In certain embodiments, a tab support plate 41 is disposed on the fixture base 40 in a pre-determined position and orientation. As a non-limiting example, the tab support plate 41 is coupled to the base 40 in a static position.

Each grill rod 36 has a main body 42 with wedge-shaped lead 44 and a keyway slot 46 formed in a fixed face of the grill rod 36. However, the main body 42 can have any shape as desired. In certain embodiments, the keyway slot 46 is sized to receive the key 22 on the support plate 20 of the cell tab 14. It is understood that the keyway slot 46 may be slightly larger than the key 22 to provide clearance for the key 22 to freely slide within the keyway slot 46.

Figure 6:
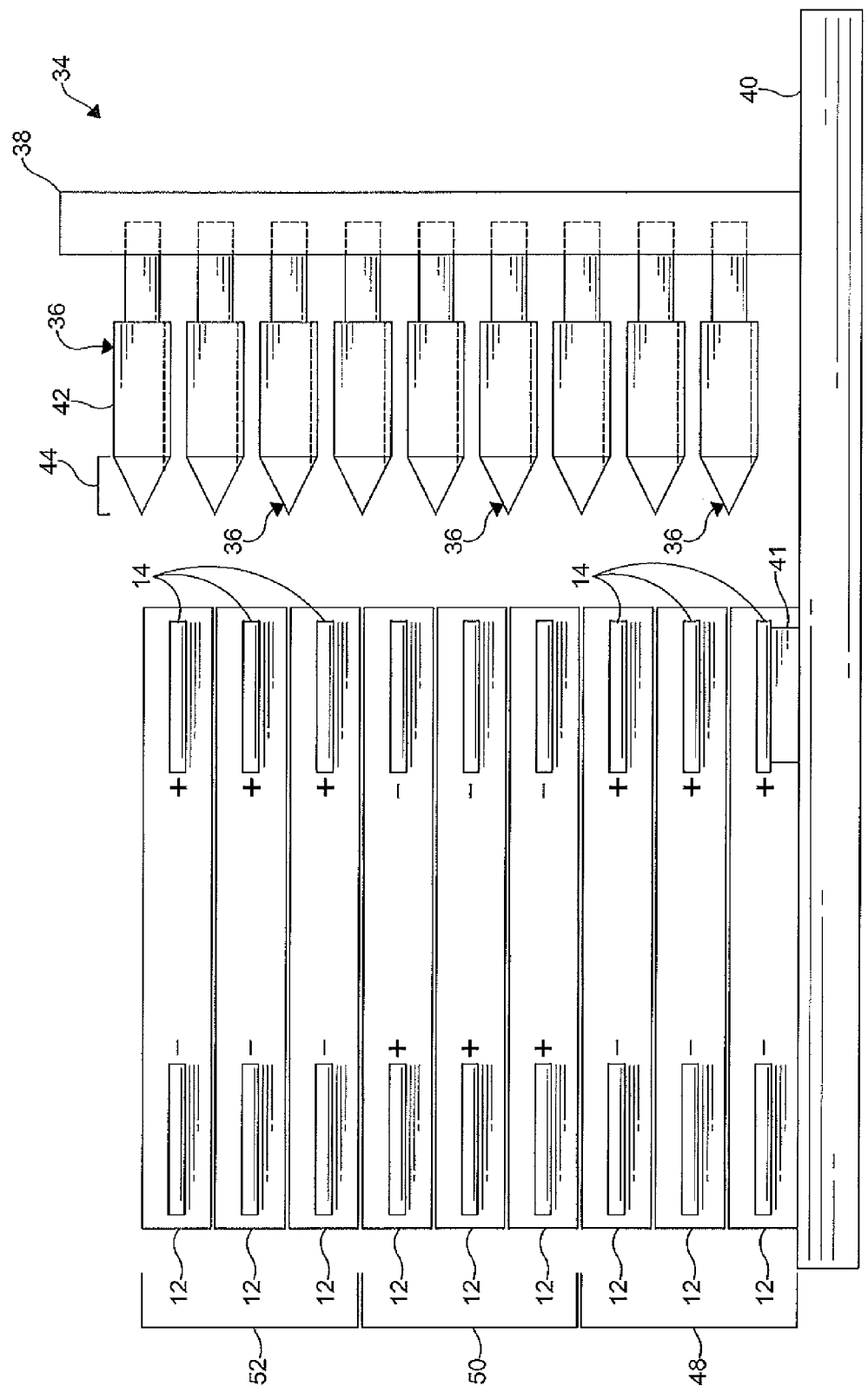
FIG. 6 is a front elevational view of the grill fixture of FIG. 4, showing a stack of battery cells disposed on a base thereof.

FIGS. 6-7 illustrate an assembly operation for the battery module 10 according to an embodiment of the present invention. Initially, the battery cells 12 are disposed on the base 40 of the grill fixture 34 in a stacked relationship. As shown, at least one of the tabs 14 is directly supported by the tab support plate 41.

The grill carrier 38 is caused to slide relative to the fixture base 40 such that each of the grill rods 36 is disposed through a space between the tabs 14 of each adjacent pair of battery cells 12. During sliding, the lead 44 of each of the grill rods 36 flexes the tabs 14 and guides the tabs 14 into a fixed spacing, which is determined by a sizing of the grill rods 36. It is understood that each of the keys 22 on the support plate 20 of each of the tabs 14 is received in a corresponding keyway slot 46 on the grill rods 36 to facilitate alignment of the tabs 14.

With the tabs 14 firmly supported by the grill rods 36 through the key-keyway engagement, the busbars 16 are pressed onto the tabs 14. Specifically, each tab 14 is received in the respective aperture 30 of the sockets 26 of the busbars 16. Once the busbars 16 are secured, the grill rods 36 are caused to slide out of the stack of the battery cells 12 to complete the assembly operation without requiring welding. However, it is understood that in certain embodiments, the tabs 14 can also be welded to the busbars 16.

Figure 7B:
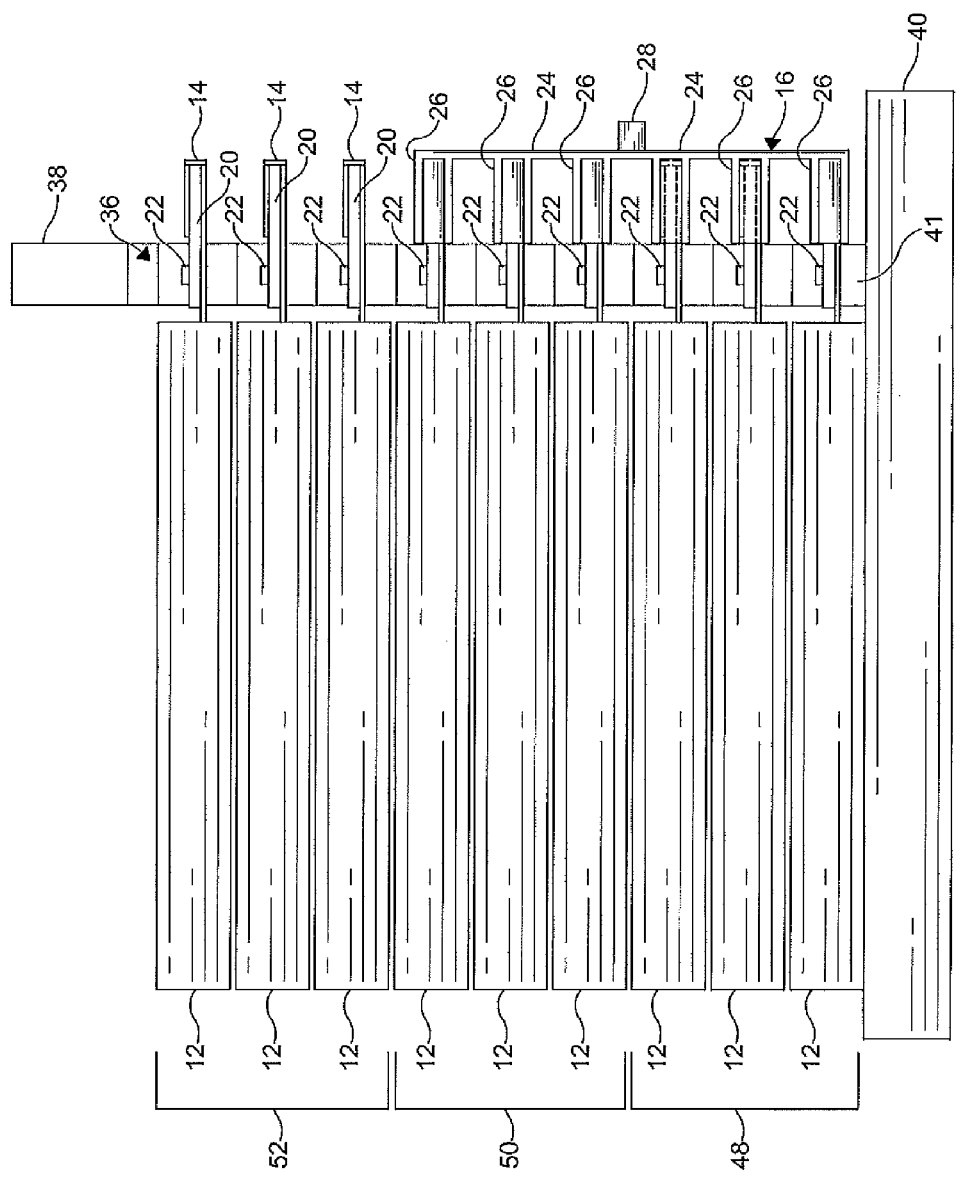
FIG. 7B is a side elevational view of the grill fixture of FIG. 4 during an assembly process.
Figure 8:
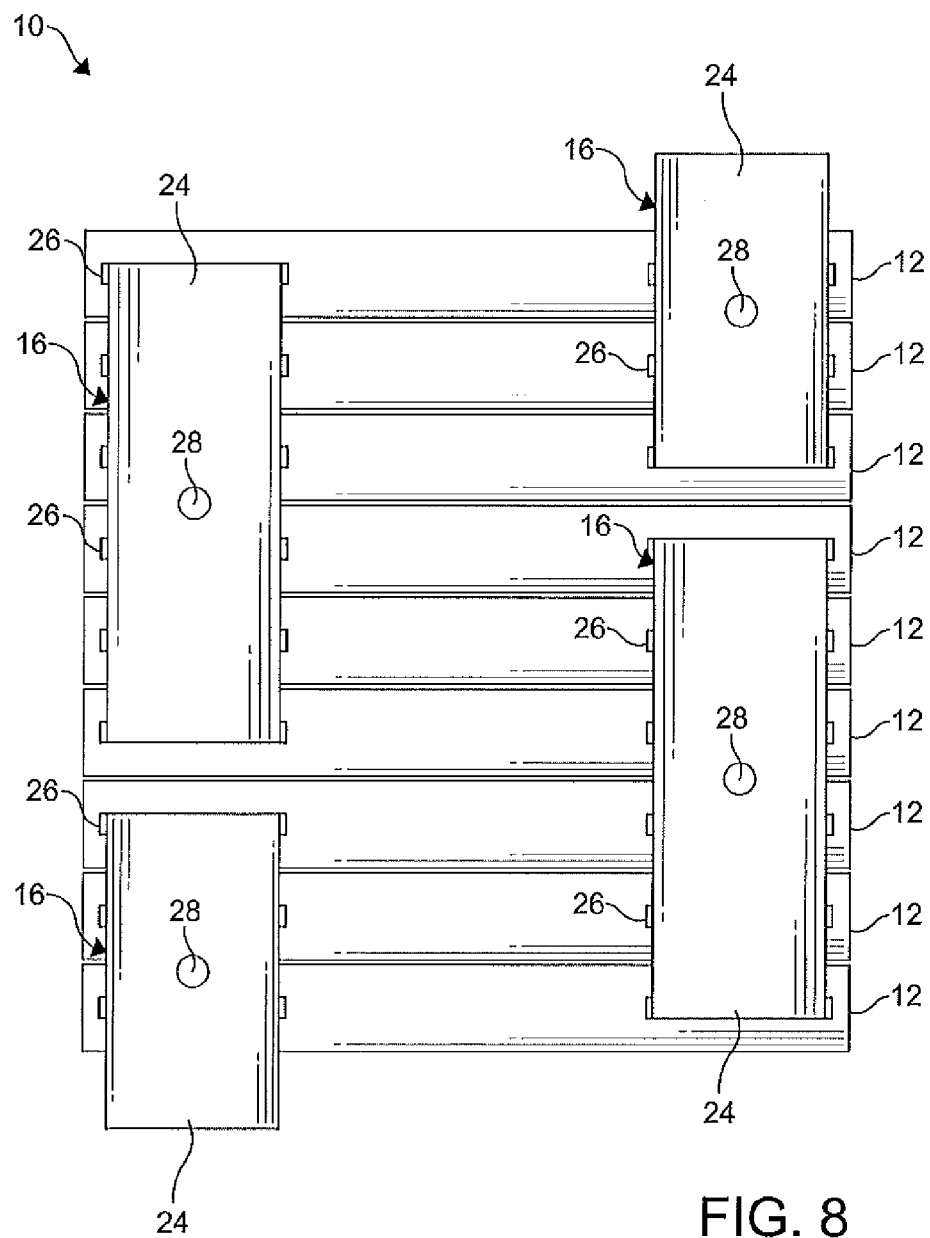
FIG. 8 is a top plan view of the battery module of FIG. 1 with a control plate removed.

As a non-limiting example, nine of the battery cells 12 are shown in the stack. Three adjacent battery cells 12 are arranged in a first parallel unit 48 having a positive (+) one of the tabs 14 aligned with a positive (+) one of the tabs 14 on an adjacent battery cell 12 and a negative (−) one of the tabs 14 aligned with a negative (−) one of the tabs 14 of an adjacent battery cell 12. A second parallel unit 50 is disposed adjacent the first parallel unit 48, wherein each of the battery cells 12 of the second parallel unit 50 are arranged to align the tabs 14 in a juxtaposed relation compared to the battery cells 12 of the first parallel unit 48. A third parallel unit 52 is disposed adjacent the second parallel unit 50, wherein each of the battery cells 12 of the third parallel unit 52 is arranged to align the tabs 14 in a juxtaposed relation compared to the battery cells 12 of the second parallel unit 50 (i.e. in the same arrangement as the first parallel unit 48). As a further example, one of the busbars 16 includes six sockets 26, wherein each of the sockets 26 receives one of the tabs 14, as shown in FIGS. 7A-7B. Specifically, three of the adjacent positive tabs 14 of the first parallel unit 48 are and three negative tabs 14 of the second parallel unit 50 are received in the sockets 26 of the busbar 16 to couple the tabs 14 in series from the first parallel unit 48 to the second parallel unit 50. It is understood that the busbars 16 can be configured to fit a connection requirement of any number of battery cells 12 in any configuration. As a non-limiting example, another set of the grill carriers 38 and the grill rods 36 can be applied to an opposite side of the battery cells 12 and a plurality of the busbars 16 are disposed on the battery tabs 14 to complete a busbar connection for each of the battery cells 12, as shown in FIG. 8.

It is also understood that the individual busbar 16 can be replaced by a monolithic busbar plate (not shown) for connecting the tabs 14 in one insertion, eliminating the need of the control plate 18.

Since the busbars 16 are selectively removable from the tabs 14, the battery module 10 is easily repairable and remanufacturable at a minimal effort and cost. The battery module 10 maintains a flexibility in serial/parallel connection of the battery cells 12 and minimizes an occurrence of uneven tab alignment.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method for assembling a battery module, the method comprising the steps of:

providing an apparatus having a base, a grill carrier moveable relative to the base, and a grill rod coupled to the grill carrier, the grill rod having a main body with a longitudinal axis generally parallel to the base;

disposing a plurality of battery cells on the base in a stacked relationship, each of the battery cells having a pair of tabs extending therefrom;

moving the grill carrier toward the battery cells to dispose the grill rod between at least one tab of each of an adjacent pair of the battery cells; and coupling a busbar to the at least one tab of each of an adjacent pair of the battery cells.

2. The method according to claim 1, wherein at least one of the tabs includes a support plate coupled thereto.

3. The method according to claim 2, wherein the support plate includes a key protruding from a surface thereof.

4. The method according to claim 3, wherein the grill rod includes a keyway slot formed therein to engage the key formed on the support plate.

5. The method according to claim 1, wherein the busbar includes a socket having an aperture to receive one of the tabs.

6. The method according to claim 5, wherein the at least one tab of each of a pair of adjacent battery cells is press-fitted into a corresponding one of the apertures of the busbar.

7. The method according to claim 1, further comprising the step of providing a support plate disposed on the base to support a tab of one of the battery cells during assembly of the battery module.

\* \* \* \* \*